United States Patent
Li et al.

(10) Patent No.: US 10,433,233 B2
(45) Date of Patent: Oct. 1, 2019

(54) METHOD AND APPARATUS FOR DETERMINING POSITION OF ROUTING NODE AND TERMINAL EQUIPMENT

(71) Applicant: Fujitsu Limited, Kawasaki-shi, Kanagawa (JP)

(72) Inventors: Hongchun Li, Beijing (CN); Jun Tian, Beijing (CN); Chen Ao, Beijing (CN); Yi Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/714,379

(22) Filed: Sep. 25, 2017

(65) Prior Publication Data

US 2018/0092021 A1    Mar. 29, 2018

(30) Foreign Application Priority Data

Sep. 26, 2016 (CN) .......................... 2016 1 0851254

(51) Int. Cl.
*H04W 40/20* (2009.01)
*H04W 16/20* (2009.01)
(Continued)

(52) U.S. Cl.
CPC ............. *H04W 40/20* (2013.01); *H04L 41/00* (2013.01); *H04L 45/124* (2013.01); *H04W 4/70* (2018.02);
(Continued)

(58) Field of Classification Search
CPC ....... H04W 40/20; H04W 4/70; H04W 16/20; H04L 45/124; H04L 41/00; H04L 47/15;
(Continued)

(56) References Cited

U.S. PATENT DOCUMENTS

| | | | |
|---|---|---|---|
| 8,855,006 B2* | 10/2014 | Gloss ................... | H04L 41/0896 370/253 |
| 2012/0294186 A1* | 11/2012 | Gloss ................... | H04L 41/0896 370/253 |

FOREIGN PATENT DOCUMENTS

| | | |
|---|---|---|
| CN | 102300282 A | 12/2011 |
| CN | 103297983 A | 9/2013 |

(Continued)

OTHER PUBLICATIONS

Extended European Search Report dated Dec. 19, 2017 in corresponding European Patent Application No. 17188874.6, 7 pages.
(Continued)

*Primary Examiner* — Brian T O Connor
(74) *Attorney, Agent, or Firm* — Staas & Halsey LLP

(57) ABSTRACT

A method and apparatus for determining a position of a routing node and terminal equipment. Where the method includes: generating a 0-th generation routing node deployment scheme set according to a link connection relationship among sensor nodes, a gateway node and deployable routing nodes in a network; calculating a fitness of each routing node deployment scheme in a j-th generation routing node deployment scheme set; processing the j-th generation routing node deployment scheme set according to the fitness; and selecting a routing node deployment scheme from the routing node deployment scheme set satisfying the predetermined condition. In determining a position of a routing node, optimizing the number of routing nodes and optimizing routing paths are both taken into account, thereby obtaining a routing node deployment scheme with minimum routing nodes and which can also ensure data transmission performance of the network.

15 Claims, 11 Drawing Sheets

$I=\{C,E,F,H,J\} \rightarrow I=\{B,C,F,H,E,J\}$

(51) Int. Cl.
    *H04L 12/24*     (2006.01)
    *H04W 4/70*     (2018.01)
    *H04L 12/721*     (2013.01)
    *H04L 12/801*     (2013.01)
    *H04L 12/911*     (2013.01)

(52) U.S. Cl.
    CPC ......... *H04W 16/20* (2013.01); *H04L 41/0896* (2013.01); *H04L 47/15* (2013.01); *H04L 47/782* (2013.01); *H04L 47/823* (2013.01)

(58) Field of Classification Search
    CPC .. H04L 41/0896; H04L 47/782; H04L 47/823
    See application file for complete search history.

(56) References Cited

FOREIGN PATENT DOCUMENTS

| | | |
|---|---|---|
| CN | 104883702 A | 9/2015 |
| CN | 105430706 A | 3/2016 |

OTHER PUBLICATIONS

Vinh Trong Le et al., "A Novel PSO-Based Algorithm for Gateway Placement in Wireless Mesh Networks", 2011 IEEE 3$^{rd}$ International Conference on Communication Software and Networks (ICCSN), IEEE, May 27, 2011, pp. 41-45.

Rastin Pries et al., "A Genetic Approach for Wireless Mesh Network Planning and Optimization", Wireless Communications and Mobile Computing, ACM, New York, NY, Jun. 21, 2009, pp. 1422-1427.

Admir Barolli et al., "A Study on the Performance of Search Methods for Mesh Router Nodes Placement Problem", 2011 IEEE International Conference on Advanced Information Networking and Applications (AINA), IEEE, Mar. 22, 2011, pp. 756-763.

F. Xhafa et al., "Genetic Algorithms for Efficient Placement of Router Nodes in Wireless Mesh Networks", 2010 24th Institute of Electrical and Electronics Engineers International Conference on Advanced Information Networking and Applications; Dec. 31, 2010, pp. 465-472.

\* cited by examiner $I=\{B,E,I\} \rightarrow I=\{A,D,E\}$ $I=\{C,E,F,H,J\} \rightarrow I=\{B,C,F,H,E,J\}$

METHOD AND APPARATUS FOR DETERMINING POSITION OF ROUTING NODE AND TERMINAL EQUIPMENT

CROSS-REFERENCE TO RELATED APPLICATIONS

This application claims the benefit of Chinese Application No. 201610851254.3, filed Sep. 26, 2016, in the Chinese Intellectual Property Office, the disclosure of which is incorporated herein by reference.

BACKGROUND

1. Field

This disclosure relates to the field of communication technologies, and in particular to a method and apparatus for determining a position of a routing node and terminal equipment.

2. Description of the Related Art

As progress of communication technologies continues, wireless sensor networks have developed rapidly, not only bringing convenience to people's lives, but also changing styles of people's production, productivity and lives.

A wireless sensor network includes sensor nodes, routing nodes and a gateway node. In the wireless sensor network, the routing nodes constitute information exchange channels between the sensor nodes and the gateway node, which are important components of the network. After the sensor nodes finish data acquisition, they need to transmit the data to the gateway node. When the sensor nodes and the gateway node are unable to communicate directly, the routing nodes forward the data between them.

In a practical network deployment, UE selects types, numbers and positions of sensor nodes and gateway node according to particular application demands, and environmental limitations, etc. When a range of the network deployment is very large, distances between the sensor nodes and the gateway node exceed a communication radius, and a network is hard to be constituted directly, and at this moment, some routing nodes need to be deployed in the network. The routing nodes function to connect the sensor nodes and the gateway node, which decide efficiency and reliability of data transmission. And the number of the routing nodes in the network usually occupies a very large proportion, that is, a hardware cost, a deployment cost and a maintenance cost of positions of the routing nodes are important components of a network cost. Hence, selection of positions of routing nodes has a large effect on performance and cost of a network.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

Additional aspects and/or advantages will be set forth in part in the description which follows and, in part, will be apparent from the description, or may be learned by practice of the embodiments.

It was found by the inventors that in existing deployment of a wireless sensor network, deployment personnel often select positions of routing nodes according to their experiences or specific rules. For example, a common rule includes limiting a maximum distance between neighboring nodes, ensuring that there exists no blockage between nodes, and node positions constituting specific geometric figures, etc. However, the above methods cannot ensure reliability of network deployment and achieve an optimal deployment effect.

Embodiments of this disclosure provide a method and apparatus for determining a position of a routing node and terminal equipment, in which in determining a position of a routing node, optimizing the number of routing nodes and optimizing routing paths are both taken into account, thereby obtaining a routing node deployment scheme with minimum routing nodes and which can also ensure data transmission performance of the network.

According to a first aspect of the embodiments of this disclosure, there is provided an apparatus for determining a position of a routing node, including:

an initializing module configured to generate a 0-th generation routing node deployment scheme set according to a link connection relationship among sensor nodes, a gateway node and deployable routing nodes in a network;

an evaluating module configured to calculate a fitness of each routing node deployment scheme in a j-th generation routing node deployment scheme set, the fitness being a function of a relationship between a minimum cost path and the number of routing nodes of each routing node deployment scheme, and j being an integer greater than or equal to 0;

a processing module configured to process the j-th generation routing node deployment scheme set according to the fitness, so as to generate a (j+1)-th generation routing node deployment scheme set; and a first determining module configured to, when the (j+1)-th generation routing node deployment scheme set satisfies a predetermined condition, select a routing node deployment scheme from the routing node deployment scheme set satisfying the predetermined condition.

According to a second aspect of the embodiments of this disclosure, there is provided terminal equipment, including the apparatus as described in the first aspect.

According to a third aspect of the embodiments of this disclosure, there is provided a method for determining a position of a routing node, including:

generating a 0-th generation routing node deployment scheme set according to a link connection relationship among sensor nodes, a gateway node and deployable routing nodes in a network;

calculating a fitness of each routing node deployment scheme in a j-th generation routing node deployment scheme set, the fitness being a function of a relationship between a minimum cost path and the number of routing nodes of each routing node deployment scheme, and j being an integer greater than or equal to 0;

processing the j-th generation routing node deployment scheme set according to the fitness, so as to generate a (j+1)-th generation routing node deployment scheme set; and when the (j+1)-th generation routing node deployment scheme set satisfies a predetermined condition, selecting a routing node deployment scheme from the routing node deployment scheme set satisfying the predetermined condition.

An advantage of the embodiments of this disclosure exists in that with the embodiments of this disclosure, in determining a position of a routing node, optimizing the number of routing nodes and optimizing routing paths are both taken into account, thereby obtaining a routing node deployment scheme with minimum routing nodes and which can also ensure data transmission performance of the network.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/including/includes" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

For the sake of easy understanding, terms concerned in the embodiments shall be explained below. A genetic algorithm is a random search algorithm based on biologically natural selection and genetic mechanism, in which optimization search is performed by simulating a biological evolution process. In recent years, the genetic algorithm has been widely used in the field of wireless network deployment. In the genetic algorithm, a solution of a problem needing to be solved is referred to as an individual, and multiple solutions are referred to as a population. A problem needing to be solved in the embodiments is to determine a routing node deployment scheme. Hence, a routing node deployment scheme $I=\{p_1, p_2, \ldots, p_i\}$ is referred to as an individual of the genetic algorithm; where, $p_i$ is a deployment position of a routing node, and I is a set of deployment positions of all routing nodes needed in network deployment.

The embodiments of this disclosure shall be described below with reference to the accompanying drawings.

Embodiment 1

Figure 1:
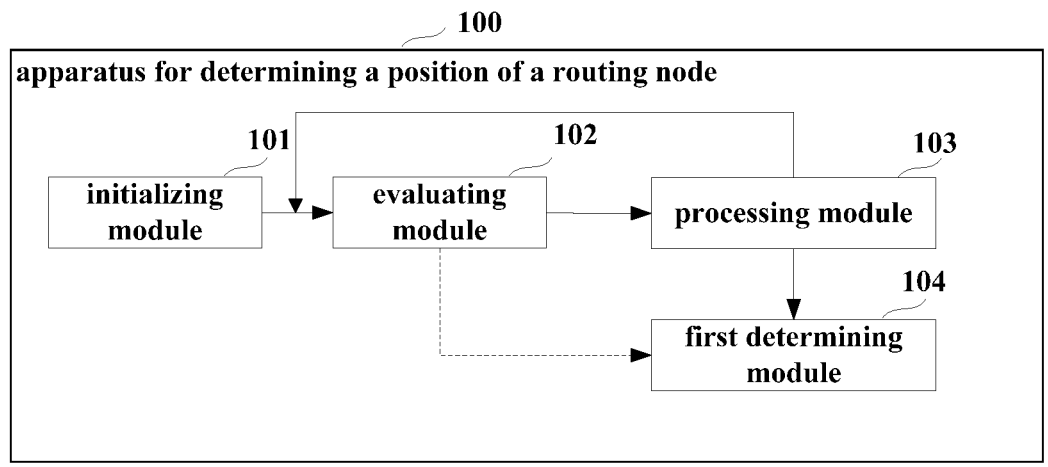
FIG. 1 is a schematic diagram of an apparatus for determining a position of a routing node in Embodiment 1.

The embodiment of this disclosure provides an apparatus for determining a position of a routing node. FIG. 1 is a schematic diagram of the apparatus. Referring to FIG. 1, the apparatus 100 includes an initializing module 101, an evaluating module 102, a processing module 103 and a first determining module 104. In this embodiment, the initializing module 101 generates a 0-th generation routing node deployment scheme set according to a link connection relationship among sensor nodes, a gateway node and deployable routing nodes in a network, the evaluating module 102 calculates a fitness of each routing node deployment scheme in a j-th generation routing node deployment scheme set, the fitness being a function of a relationship between a minimum cost path and the number of routing nodes of each routing node deployment scheme, and j being an integer greater than or equal to 0, the processing module 103 processes the j-th generation routing node deployment scheme set according to the fitness, so as to generate a (j+1)-th generation routing node deployment scheme set, and when the (j+1)-th generation routing node deployment scheme set satisfies a predetermined condition, the first determining module 104 selects a routing node deployment scheme from the routing node deployment scheme set satisfying the predetermined condition.

In this embodiment, the initializing module 101 generates the 0-th generation routing node deployment scheme set, the evaluating module 102 calculates the fitness of each routing node deployment scheme in a 0-th (j=0) generation routing node deployment scheme set, the processing module 103 processes the 0-th generation routing node deployment scheme set according to the fitness, so as to generate a first (j+1) generation routing node deployment scheme set, and if the first generation routing node deployment scheme set satisfies the predetermined condition, the first determining module 104 selects a final routing node deployment scheme from first generation routing node deployment scheme set; otherwise, for the first generation routing node deployment scheme set, the evaluating module 102 and the processing module 103 perform similar processing (corresponding to that j=1), and so on, until a final routing node deployment scheme is obtained.

With the apparatus of this embodiment, in determining a position of a routing node, optimizing the number of routing nodes and optimizing routing paths are both taken into account, thereby obtaining a routing node deployment scheme with minimum routing nodes and which can also ensure data transmission performance of the network.

The components of the apparatus 100 for determining a position of a routing node shall be described below, respectively.

In this embodiment, before generating the 0-th generation routing node deployment scheme set, the initializing module 101 needs to obtain network deployment information of a wireless sensor network, including positions of sensor nodes, a gateway node and deployable routing nodes, and connection relationships thereof, etc.; in this embodiment, when quality of a link between two nodes is greater than a predetermined threshold value, it shows that there exists a connection relationship between the two nodes; and the quality of a link may be expressed by such indices as a signal strength, or a packet drop rate, etc.; however, this embodiment is not limited thereto.

In an implementation, the network deployment information may be expressed by a connection graph structure G=(V,E); where, V is a vertex set containing a set $P_S$ of deployment positions of the sensor nodes, a set $P_G$ of a deployment position of the gateway node, and a set $P_R$ of deployment positions of the routing nodes, in a network, and E is a set of edges containing a set E={$(p_i, p_j)$}, $p_i$, $p_j \in V$ of two nodes having a connection relationship; where, $(p_i, p_j)$ denotes that quality of a link between $p_i$ and $p_j$ is greater than the predetermined threshold value, that is, there exists a connection relationship.

Figure 2:
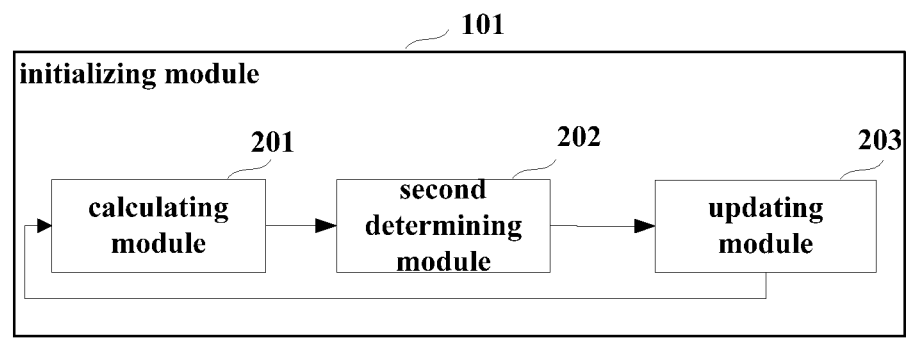
FIG. 2 is a schematic diagram of an example of an initializing module in Embodiment 1.

FIG. 2 is a schematic diagram of an implementation of the initializing module 101. As shown in FIG. 2, in this implementation, the initializing module 101 includes a calculating module 201, a second determining module 202 and an updating module 203. The calculating module 201 calculates a minimum cost path from each sensor node to the gateway node according to the link connection relationship, when there exists a minimum cost path for all the sensor nodes, the second determining module 202 takes a set of positions of deployable routing nodes on minimum cost paths as a routing node deployment scheme, and the updating module 203 removes the positions of the deployable routing nodes in the routing node deployment scheme from the link connection relationship to generate an updated link connection relationship, so that the initializing module 101 generates a next routing node deployment scheme according to the updated link connection relationship.

In this embodiment, the minimum cost path denotes a routing path with a minimum routing cost from a sensor node to a gateway node. A routing path consists of multiple links, each link having a routing cost, and a sum of routing costs of all links on the routing path being a routing cost of the routing path.

In this embodiment, when there exists a sensor node with no minimum cost path in all the sensor nodes, the second determining module 202 takes a previously obtained routing node deployment scheme set as a 0-th (initial) generation routing node deployment scheme set.

Figure 3:
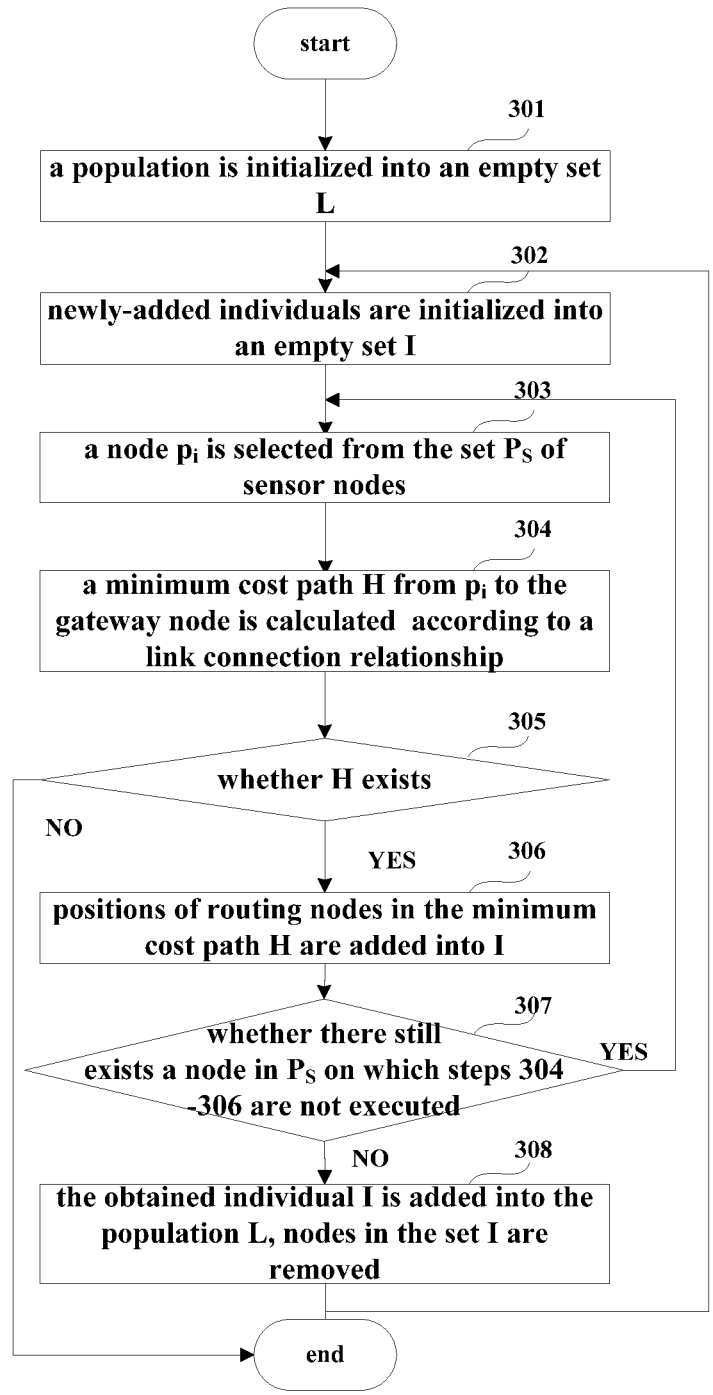
FIG. 3 is an operational flowchart of an example of the initializing module in Embodiment 1.

FIG. 3 is an operational flowchart of generating the 0-th generation routing node deployment scheme set by the initializing module 101 in this embodiment. As shown in FIG. 3, the flow includes:

step 301: a population is initialized into an empty set L;

step 302: newly-added individuals are initialized into an empty set I;

step 303: a node $p_i$ is selected from the set $P_S$ of sensor nodes;

step 304: a minimum cost path H from $p_i$ to the gateway node is calculated by the calculating module 201 according to a link connection relationship;

step 305: whether H exists is judged, and step 306 is executed when a result of judgment is yes, otherwise, the operations is terminated;

step 306: positions of routing nodes in the minimum cost path H are added into I by the second determining module 202;

step 307: whether there still exists a node in $P_S$ on which steps 304-306 are not executed is judged, and step 303 is executed when a result of judgment is yes, otherwise, step 308 is executed; and step 308: the obtained individual I is added into the population L by the second determining module 202, nodes in the set I obtained in step 308 are removed by the updating module 203 from $P_R$, so as to obtain an updated connection relationship, and then turns back to step 302, so as to generate a next individual I according to the updated link connection relationship.

In steps 304-306, the minimum cost path may be calculated according to the connection graph G and the related art may be referred to for a particular calculation method, in which the Dijkstra algorithm and the Bellman-Ford algorithm are commonly used.

Figure 4:
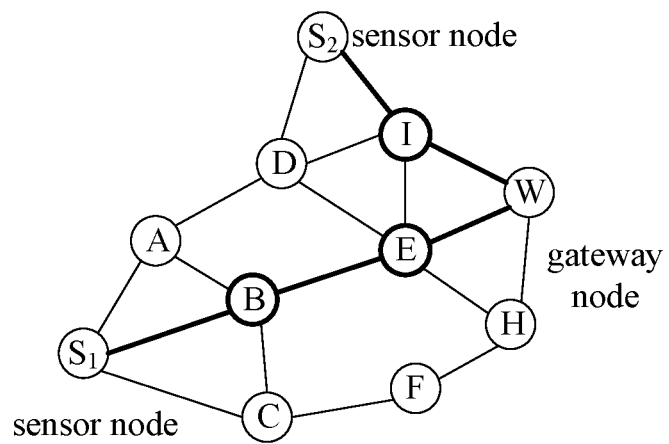
FIGS. 4 and 5 are schematic diagrams of obtaining an initialized routing node deployment scheme set according to a connection graph in Embodiment 1.
Figure 5:
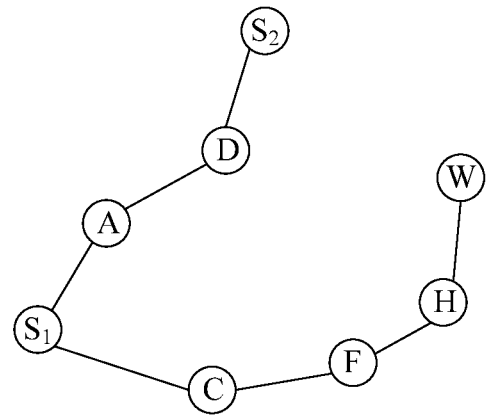

FIGS. 4 and 5 are schematic diagrams of obtaining the 0-th generation routing node deployment scheme set by initialization according to the connection graph in this embodiment. As shown in FIGS. 4 and 5, S1 and S2 are sensor nodes, W is a gateway node, and other nodes A, B, C, D, E, F, H and I are deployable positions of routing nodes. As shown in FIG. 4, minimum cost paths from S1 and S2 to W (for example, let costs of edges to be identical, and a minimum cost path is equivalent to a shortest path) are respectively calculated in steps 302-308. For example, a minimum cost path from S1 to W is S1-B-E-W, a minimum cost path from S2 to W is S2-I-W, nodes B, E and I on the minimum cost paths are added into an individual I1, the individual I1 is added into the population L, and then step 309 is executed, so as to remove nodes B, E and I from PR and obtain an updated connection graph. As shown in FIG. 5, in the updated connection graph shown in FIG. 5, steps 302-308 are repeated, so as to obtain a new individual I2={A,C,D,F,H}, and the new individual I2 is added into the population L, so as to obtain the population L={I1,I2}. As there exist no minimum cost paths from S1 and S2 to the gateway node after the nodes in I2 are removed from FIG.

5, initialization of the population is ended, and the population L={I1,I2} is taken as the 0-th generation routing node deployment scheme set.

In this embodiment, the evaluating module 102 calculates the function of a relationship between the minimum cost path and the number of routing nodes of each routing node deployment scheme in the j-th generation routing node deployment scheme set, and takes the function of a relationship as the fitness of the routing node deployment scheme, thereby ensuring that the cost of the routing paths of the sensor nodes is minimal and minimizing the number of routing nodes.

In an implementation, the evaluating module 102 calculates the fitness of each routing node deployment scheme according to the number of routing nodes of each routing node deployment scheme and a routing cost difference between a first minimum cost path from each sensor node to the gateway node and a second minimum cost path from each sensor node to the gateway node; In this embodiment, the first minimum cost path passes routing nodes in a range of routing node positions in the routing node deployment scheme, and the second minimum cost path passes routing nodes in a range of all the deployable routing nodes.

In this embodiment, the evaluating module 102 may calculate the fitness F of each routing node deployment scheme by using formula (1):

$$F = |I| + \lambda \frac{\sum_{p_i \in P_S} l_i - l'_i}{|P_S|};  \quad (1)$$

where, $|I|$ is the number of the routing nodes of the routing node deployment scheme, $|P_S|$ is the number of the sensor nodes in the network, $l_i$ is a routing cost of the first minimum cost path, i.e. a routing cost of a minimum cost path from the sensor node $p_i$ to the gateway node passing the positions of the routing nodes in I, $l'_i$ is a routing cost of the second minimum cost path, i.e. a routing cost of a minimum cost path from the sensor node $p_i$ to the gateway node passing all the deployable positions of the routing nodes, $\lambda$ is used to adjust a relationship between a routing path length and the number of the routing nodes, which may be determined according to an actual situation, and this embodiment is not limited thereto, and i is an integer between 1 and S.

How to calculate a fitness of a routing node deployment scheme shall be described below taking FIGS. 4 and 5 as examples. Let $\lambda=1$, and as shown in FIG. 4, the sensor node $P_S=\{S_1,S_2\}$ and passes all the deployable positions A, B, C, D, E, F, H and I of the routing nodes, the minimum cost path from $S_1$ to W is $S_1$-B-E-W, and the minimum cost path from $S_2$ to W is $S_2$-I-W. A routing node deployment scheme obtained according to above steps 301-309 is I1={B,E,I}. The minimum cost path from $S_1$ to W passing the positions of the routing nodes in I1 is $S_1$-B-E-W, and the minimum cost path from $S_2$ to W passing the positions of the routing nodes in I1 is $S_2$-I-W. Hence, in formula (1), $|I|=3$, $|P_S|=2$, $l_1'=l_1=2$, $l_2'=l_2=1$, and a fitness of the individual I1 is F=3. And as shown in FIG. 5, a routing node deployment scheme obtained according to above steps 301-309 is I2={A,C,D,F,H}, the minimum cost path from $S_1$ to W passing the positions of the routing nodes in I2 is $S_1$-C-F-H-W, and the minimum cost path from $S_2$ to W passing the positions of the routing nodes in I2 is $S_2$-D-A-$S_1$-C-F-H-W. Hence, in formula (1), $|I|=5$, $|P_S|=2$, $l_1'=2$, $l_2'=1$, $l_1=3$, $l_2=6$, and a fitness of the individual I2 is F=8.

In this embodiment, the processing module 103 processes the j-th generation routing node deployment scheme set according to the fitness obtained by the evaluating module 102 through calculation, so as to generate a (j+1)-th generation routing node deployment scheme set. In this embodiment, a genetic algorithm may be used to process the j-th generation routing node deployment scheme set to generate the (j+1)-th generation routing node deployment scheme set. There exist multiple implementations of genetic algorithms, such as a $(\mu,\lambda)$ method and a $(\mu+\lambda)$ method, and this embodiment is not limited thereto. A genetic algorithm usually includes selection, pairing crossing, and mutation processing; in this embodiment, the selection processing is to select a part from a previous generation of population and take the part as a latter generation of population, the pairing processing is to select a part of individual pairs from a population, the crossing processing is to perform crossing exchange on information on the selected individual pairs, so as to generate new individuals, and the mutation processing is to modify information on a part of individuals. And in this embodiment, the related art may be used for the selection, pairing crossing, and mutation processing, and this embodiment is not limited thereto.

After the processing module 103 processes the j-th generation routing node deployment scheme set, the (j+1)-th generation routing node deployment scheme set is generated, and whether the (j+1)-th generation routing node deployment scheme set satisfies a predetermined condition is judged. In an implementation, the predetermined condition is that j+1 equals to a first threshold value N, N being an integer greater than or equal to 1; however, this embodiment is not limited thereto; and when the (j+1)-th generation routing node deployment scheme set satisfies the predetermined condition, the evaluating module 102 may calculate the fitness of each routing node deployment scheme in the (j+1)-th generation routing node deployment scheme set, and the first determining module 104 determines a routing node deployment scheme of a minimum fitness in the (j+1)-th generation routing node deployment scheme set as a final routing node deployment scheme; however, this embodiment is not limited thereto and the first determining module 104 may select a final routing node deployment scheme from the routing node deployment scheme set by using other rules; and when the (j+1)-th generation routing node deployment scheme set does not satisfy the predetermined condition, the evaluating module 102 may calculate the fitness of each routing node deployment scheme in the (j+1)-th generation routing node deployment scheme set, and the processing module 103 processes the (j+1)-th generation routing node deployment scheme set according to the fitness of each routing node deployment scheme in the (j+1)-th generation routing node deployment scheme set calculated by the evaluating module 102, to generate a (j+2)-th generation routing node deployment scheme set, and repeats and iterates the above processing, until a routing node deployment scheme set satisfying the predetermined condition is generated, so that the first determining module 104 selects a final routing node deployment scheme from the routing node deployment scheme set satisfying the predetermined condition.

Figure 6:
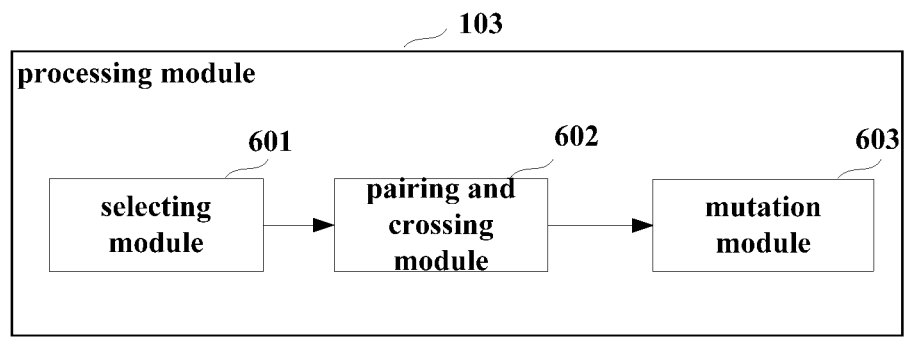
FIG. 6 is a schematic diagram of an example of a processing module in Embodiment 1.

FIG. 6 is a schematic diagram of an implementation of the processing module 103 in this embodiment. As shown in FIG. 6, the processing module includes a selecting module 601, a pairing and crossing module 602 and a mutation module 603. The selecting module 601 selects a first predetermined number of routing node deployment schemes with relatively high fitness from the j-th generation routing node deployment scheme set, so as to obtain a first routing node deployment scheme set; the pairing and crossing module 602 performs pairing and crossing processing on routing node deployment schemes in the first routing node deployment scheme set; and the mutation module 603 performs mutation processing on the pairing and crossing processed routing node deployment schemes in the first routing node deployment scheme set, so as to obtain the (j+1)-th generation routing node deployment scheme set.

In this embodiment, the mutation module 603 is modified. In an implementation, the mutation module 603 may include a first mutation module (not shown) configured to replace deployment positions of a second predetermined number of first deployable routing nodes in the routing node deployment scheme with a position of a routing neighboring node of the deployment positions of the first deployable routing nodes. And in another implementation, the mutation module 603 may include a second mutation module (not shown) configured to select deployment positions of a third predetermined number of pairs of second deployable routing nodes from the routing node deployment scheme, calculate a minimum cost path between deployment positions of each pair of second deployable routing nodes, and add deployment positions of third deployable routing nodes on the minimum cost path into the routing node deployment scheme.

In this embodiment, the processing module 103 may further include a judging module (not shown) configured to judge whether the (j+1)-th generation routing node deployment scheme set satisfies the predetermined conditions. When a result of judgment is yes, the first determining module 104 determines a final routing node deployment scheme from the routing node deployment scheme set satisfying the predetermined condition, and when the result of judgment is no, the evaluating module 102 and the processing module 103 repeat and iterate the (j+1)-th generation routing node deployment scheme set. A particular implementation process of the processing module 103 shall be described below in detail.

Figure 7:
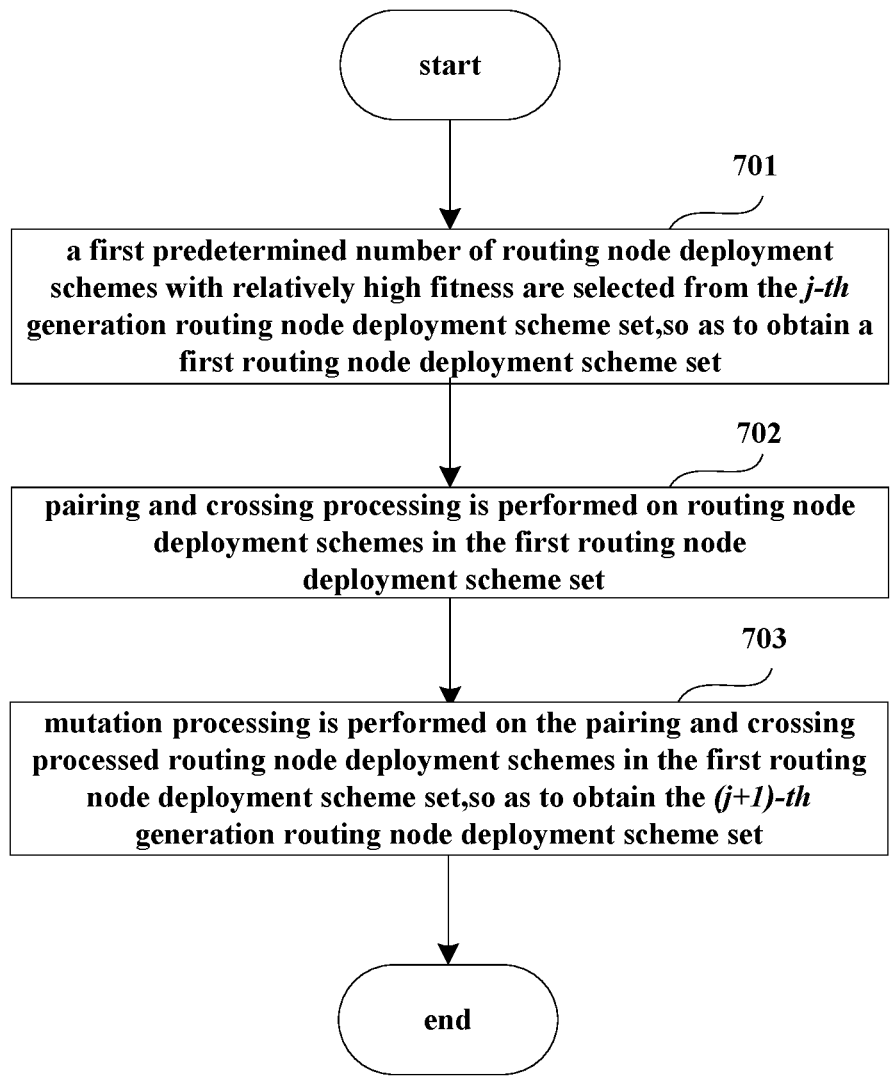
FIG. 7 is an operational flowchart of an example of the processing module in Embodiment 1.

FIG. 7 is a flowchart of a particular method for processing a routing node deployment scheme set of a certain generation by the processing module 103. As shown in FIG. 7, the flow includes:

step 701: a first predetermined number of routing node deployment schemes with relatively high fitness are selected from the j-th generation routing node deployment scheme set by the selecting module 601, so as to obtain a first routing node deployment scheme set;

step 702: pairing and crossing processing is performed on routing node deployment schemes in the first routing node deployment scheme set by the pairing and crossing module 602; and step 703: mutation processing is performed on the pairing and crossing processed routing node deployment schemes in the first routing node deployment scheme set by the mutation module 603, so as to obtain the (j+1)-th generation routing node deployment scheme set.

In this embodiment, step 701 is equivalent to a selection process in a genetic algorithm, and in step 701, the first routing node deployment scheme set may be obtained in the following manner: for example, ordering routing node deployment schemes in the j-th generation routing node deployment scheme set according to the fitness, and selecting the first predetermined number of routing node deployment schemes with relatively high fitness from the j-th generation routing node deployment scheme set; in this embodiment, the first predetermined number may be set as demanded.

In this embodiment, step 702 is equivalent to a pairing and crossing process in the genetic algorithm, and in step 702, it is assumed that there are a first predetermined number M of deployment schemes in the first routing node deployment scheme set A, each deployment scheme being expressed as A(m), m=1, 2, . . . , M; a fourth predetermined number P of pairs of deployment schemes are selected from the first routing node deployment scheme set, and positions of part of routing nodes of two deployment schemes A(s) and A(t) in each pair of deployment schemes are interchanged to obtain two new schemes A(s)' and A(t)', thereby obtaining a new scheme set A'; where, values of s and t are taken from 1~M.

For example, a pair of deployment schemes $I_1$={B,E,I} and $I_2$={A,C,D,F,H} are selected, then positions of part of routing nodes in $I_1$ and positions of part of routing nodes in $I_2$ are interchanged, such as interchanging a node B in $I_1$ and a node A in $I_2$, so as to obtain a new pair of scheme sets $I1'$={A,E,I}, $I2'$={B,C,D,F,H}, or interchanging nodes B and I in $I_1$ and nodes D and F in $I_2$, so as to obtain a new pair of scheme sets $I_1'$={D,E,F}, $I_2'$={A,C,B,I,H}.

In this embodiment, after interchange of a pair of deployment schemes A(s) and A(t) is finished, interchange of other pairs P-1 of deployment schemes is performed in the same manner as above, a process of interchange being the same as above, and being not going to be described herein any further.

In this embodiment, step 703 is equivalent to a mutation process in the genetic algorithm, and in step 703, a predetermined number of deployment schemes are selected from the new scheme set A', a predetermined position is selected from the predetermined number of deployment schemes, and the predetermined position is changed into a node different from a current node, the position of the node after mutation and positions of other nodes in the deployment scheme being not repeated.

In an implementation, in mutation, deployment positions of a second predetermined number of first deployable routing nodes in the routing node deployment scheme may be replaced with a position of a routing neighboring node of the deployment positions of the first deployable routing nodes.

Figure 8:
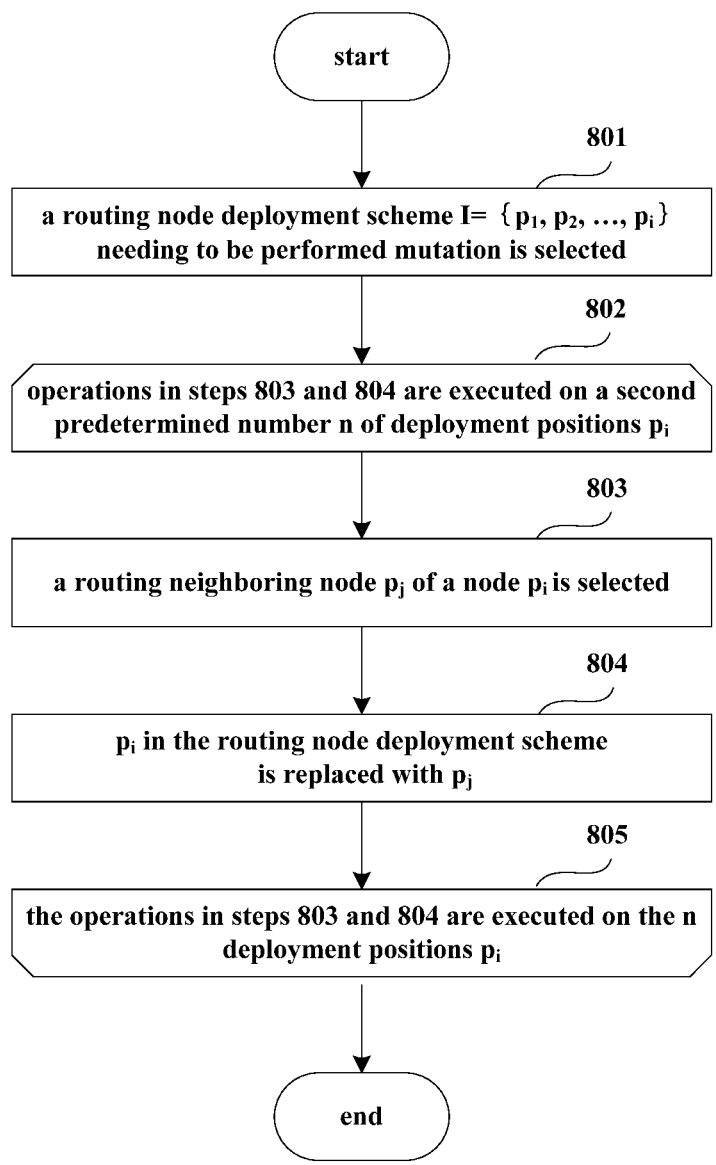
FIG. 8 is an operational flowchart of an example of a mutation module in Embodiment 1.

FIG. 8 is a flowchart of a method of an implementation of the mutation. As shown in FIG. 8, the flow includes:

step 801: a routing node deployment scheme I={$p_1$, $p_2$, . . . , $p_i$} needing to be performed mutation is selected;

step 802: operations in steps 803 and 804 are executed on a second predetermined number n of deployment positions $p_i$;

In this embodiment, the second predetermined number n may be determined as demanded, and this embodiment is not limited thereto;

step 803: a routing neighboring node $p_j$ of a node $p_i$ is selected;

In this embodiment, the neighboring node $p_j$ may be selected randomly from the neighboring nodes of the node $p_i$ according to the connection graph G;

step 804: $p_i$ in the routing node deployment scheme is replaced with $p_j$; and step 805: the operations in steps 803 and 804 are executed on the n deployment positions $p_i$.

Figure 9:
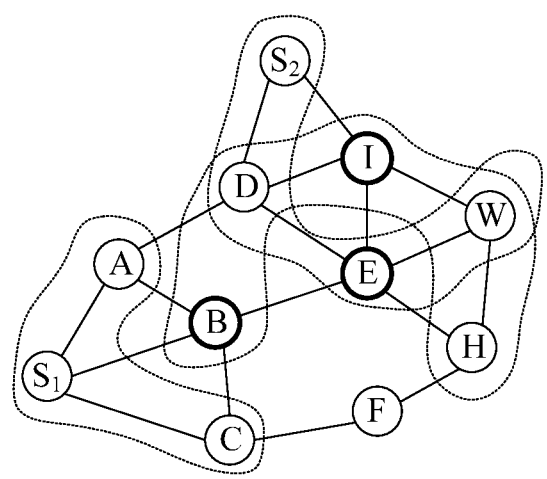
FIG. 9 is a schematic diagram of an example of performing mutation processing according to the connection graph in Embodiment 1.

FIG. 9 is a schematic diagram of an implementation of the mutation. As shown in FIG. 9, let the routing node deployment scheme I={B,E,I}, and let the second predetermined number n=3, that is, steps 803 and 804 are executed on all the routing node deployment positions. For example, for the node B, its neighboring node are {$S_1$,A,C}, and a routing node, such as the node A, is randomly selected, to replace the node B in I, for the node E, its neighboring nodes are {B,D,H,I}, and a routing node D is randomly selected to replace the node E in I, for the node I, its neighboring nodes are {$S_2$,D,E,H}, and a routing node E is randomly selected to replace the node I in I, so as to obtain a mutated new routing node deployment scheme I'={A,D,E}.

In another implementation, in mutation, a third predetermined number of pairs of second deployable routing node deployment positions may be selected from the routing node deployment scheme, a minimum cost path between deployment positions of each pair of second deployable routing nodes may be calculated, and deployment positions of third deployable routing nodes on the minimum cost path may be added into the routing node deployment scheme.

Figure 10:
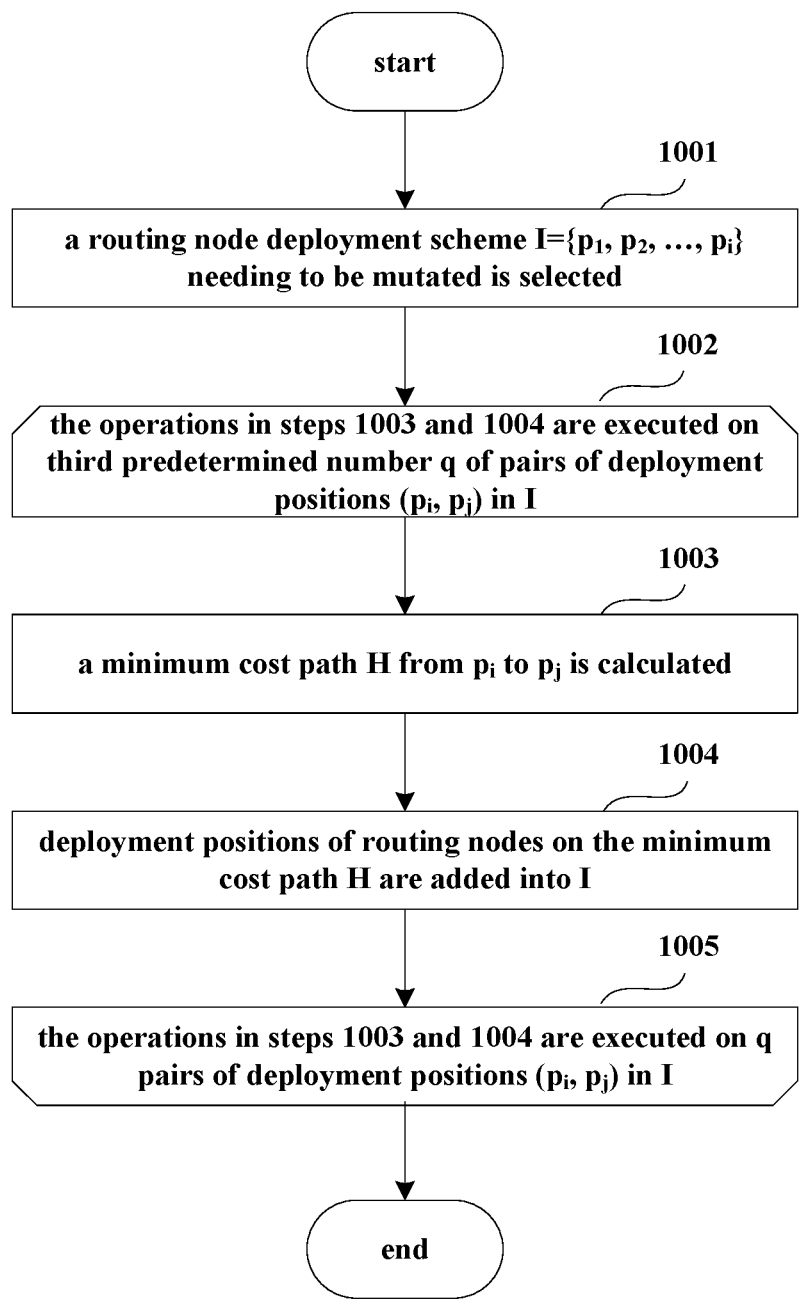
FIG. 10 is an operational flowchart of an example of the mutation module in Embodiment 1.

FIG. 10 is a flowchart of a method of an implementation of the mutation. As shown in FIG. 10, the flow includes:

step 1001: a routing node deployment scheme I={$p_1$, $p_2$, . . . , $p_i$} needing to be mutated is selected;

step 1002: the operations in steps 1003 and 1004 are executed on third predetermined number q of pairs of deployment positions ($p_i$, $p_j$) in I;

In this embodiment, the third predetermined number q of pairs may be determined as demanded, and this embodiment is not limited thereto;

step 1003: a minimum cost path H from $p_i$ to $p_j$ is calculated;

In this embodiment, the minimum cost path H from $p_i$ to $p_j$ may be calculated according to the connection graph G and the related art may be referred to for its particular implementation, which shall not be described herein any further;

step 1004: deployment positions of routing nodes on the minimum cost path H are added into I;

step 1005: the operations in steps 1003 and 1004 are executed on q pairs of deployment positions ($p_i$, $p_j$) in I.

Figure 11:
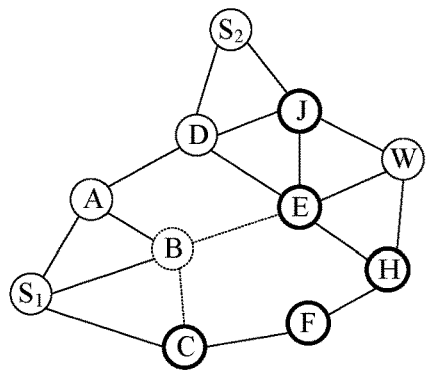
FIG. 11 is a schematic diagram of an example of performing mutation processing according to the connection graph in Embodiment 1.

FIG. 11 is a schematic diagram of an implementation of the mutation. As shown in FIG. 11, let the routing node deployment scheme I={C,E,F,H,J}, and let the third predetermined number q=1, that is, steps 1003 and 1004 are executed on one pair of deployment positions selected from I. For example, the selected pair of deployment positions is {C,E}, a minimum cost path from C to E is calculated as C-B-E according to the connection graph G (let costs of edges to be identical), and a position B of a routing node on the minimum cost path is added into the original routing node deployment scheme I, so as to obtain a mutated new routing node deployment scheme I'={B,C,E,F,H,J}.

The above implementation of the mutation may be carried out independently, or may be carried out in a combined manner, and this embodiment is not limited thereto, and is not limited to the above implementation of the mutation.

Figure 12:
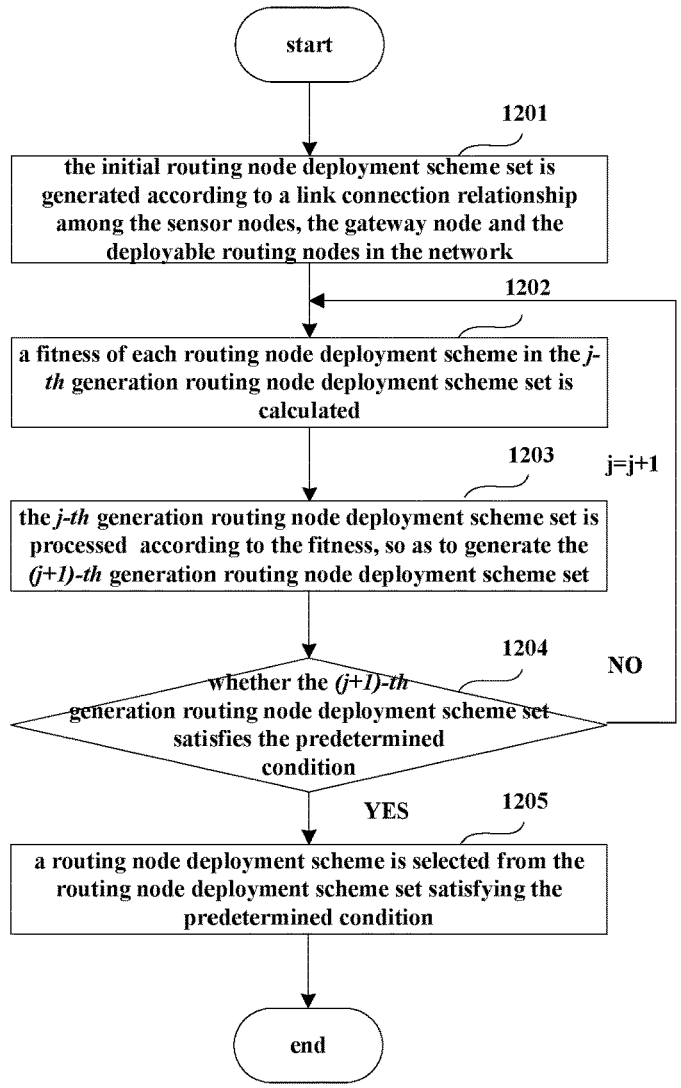
FIG. 12 is an operational flowchart of the apparatus for determining a position of a routing node in Embodiment 1.

FIG. 12 is a flowchart of an example of determining a position of a routing node by the apparatus 100 of this embodiment. As shown in FIG. 12, the flow includes:

step 1201: the initial routing node deployment scheme set is generated by the initializing module 101 according to a link connection relationship among the sensor nodes, the gateway node and the deployable routing nodes in the network, and a current initial deployment scheme set is set to be of a j-th generation (j=0);

step 1202: a fitness of each routing node deployment scheme in the j-th generation routing node deployment scheme set is calculated by the evaluating module 102;

step 1203: the j-th generation routing node deployment scheme set is processed by the processing module 103 according to the fitness, so as to generate the (j+1)-th generation routing node deployment scheme set;

step 1204: whether the (j+1)-th generation routing node deployment scheme set satisfies the predetermined condition is judged, and step 1205 is executed when a result of judgment is yes; otherwise, makes j=j+1, and then turns back to execute step 1202; and step 1205: a routing node deployment scheme is selected from the routing node deployment scheme set satisfying the predetermined condition.

In this embodiment, what described above may be referred to for particular implementations of steps 1201-1205, which shall not be described herein any further.

With the apparatus of this embodiment, in determining a position of a routing node, optimizing the number of routing nodes and optimizing routing paths are both taken into account, thereby obtaining a routing node deployment scheme with minimum routing nodes and which can also ensure data transmission performance of the network.

Embodiment 2

The embodiment of this disclosure provides terminal equipment, including the apparatus for determining a position of a routing node described in Embodiment 1.

Figure 13:
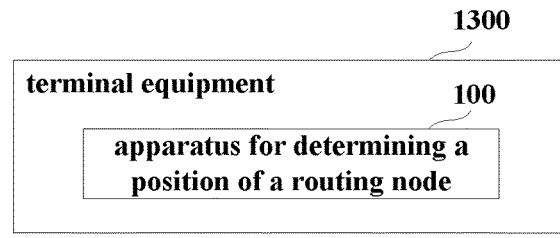
FIG. 13 is a schematic diagram of terminal equipment in Embodiment 2.

FIG. 13 is a schematic diagram of the terminal equipment. As shown in FIG. 13, the terminal equipment 1300 includes the apparatus 100 for determining a position of a routing node, the apparatus 100 being configured to: generate a 0-th generation routing node deployment scheme set according to a link connection relationship among sensor nodes, a gateway node and deployable routing nodes in a network; calculate a fitness of each routing node deployment scheme in a j-th generation routing node deployment scheme set, the fitness being a function of a relationship between a minimum cost path and the number of routing nodes of each routing node deployment scheme, and j being an integer greater than or equal to 0; process the j-th generation routing node deployment scheme set according to the fitness, so as to generate a (j+1)-th generation routing node deployment scheme set; and when the (j+1)-th generation routing node deployment scheme set satisfies a predetermined condition, select a routing node deployment scheme from the routing node deployment scheme set satisfying the predetermined condition. As the apparatus 100 for determining a position of a routing node has been described in detail in Embodiment 1, its contents are incorporated herein, and shall not be described herein any further.

Figure 14:
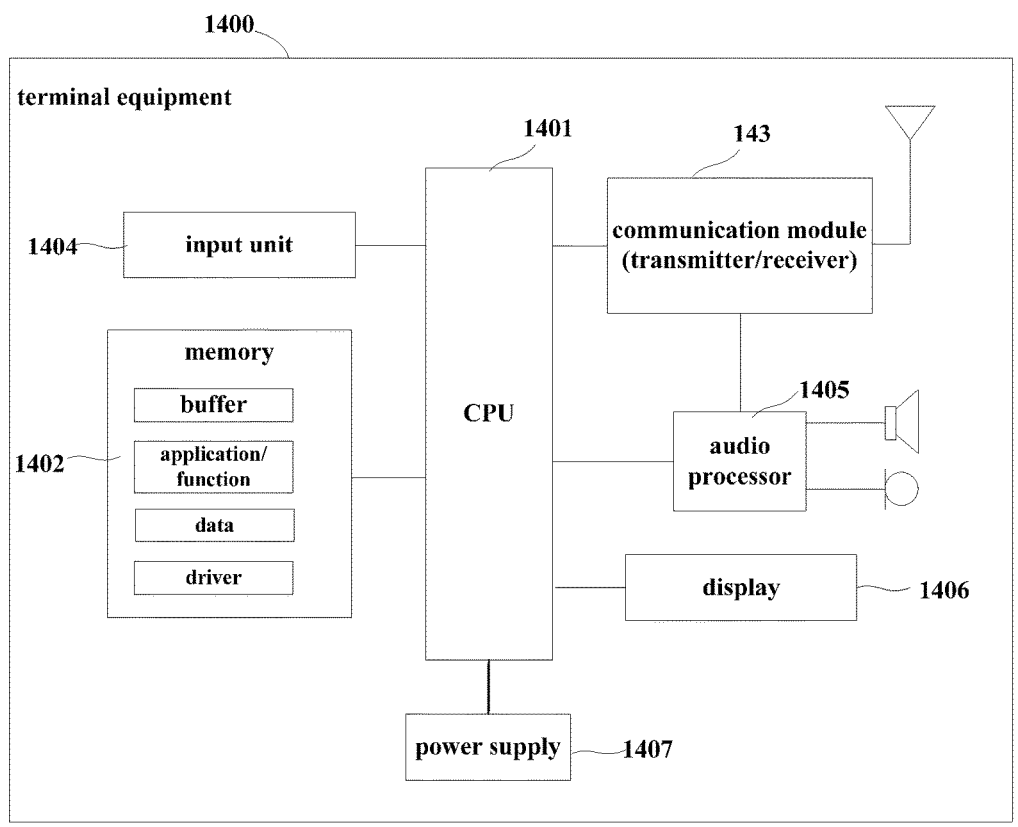
FIG. 14 is a schematic diagram of a systematic structure of the terminal equipment of Embodiment 2.

FIG. 14 is a block diagram of a systematic structure of the terminal equipment of this embodiment. As shown in FIG. 14, the terminal equipment 1400 may include a central processing unit 1401 and a memory 1402, the memory 1402 being coupled to the central processing unit 1401. It should be noted that this figure is illustrative only, and other types of structures may also be used, so as to supplement or replace this structure and achieve a telecommunications function or other functions.

In an implementation, the functions of the apparatus 100 for determining a position of a routing node described in Embodiment 1 may be integrated into the central processing unit 1401. In this embodiment, the central processing unit 1401 may be configured to: generate a 0-th generation routing node deployment scheme set according to a link connection relationship among sensor nodes, a gateway node and deployable routing nodes in a network; calculate a fitness of each routing node deployment scheme in a j-th generation routing node deployment scheme set, the fitness being a function of a relationship between a minimum cost path and the number of routing nodes of each routing node deployment scheme, and j being an integer greater than or equal to 0; process the j-th generation routing node deployment scheme set according to the fitness, so as to generate a (j+1)-th generation routing node deployment scheme set; and when the (j+1)-th generation routing node deployment scheme set satisfies a predetermined condition, select a routing node deployment scheme from the routing node deployment scheme set satisfying the predetermined condition.

In another implementation, the apparatus 100 for determining a position of a routing node described in Embodiment 1 and the central processing unit 1401 may be configured separately. For example, the apparatus 100 may be configured as a chip connected to the central processing unit 1401, with its functions being realized under control of the central processing unit 1401.

As shown in FIG. 14, the terminal equipment 1400 may further include a communication module 1403, an input unit 1404, an audio processor 1405, a display 1406 and a power supply 1407. It should be noted that the terminal equipment 1400 does not necessarily include all the parts shown in FIG. 14, and furthermore, the terminal equipment 1400 may include parts not shown in FIG. 14, and the related art may be referred to.

As shown in FIG. 14, the central processing unit 1401 is sometimes referred to as a controller or control, and may include a microprocessor or other processor devices and/or logic devices. The central processing unit 1401 receives input and controls operations of every components of the terminal equipment 1400.

In this embodiment, the memory 1402 may be, for example, one or more of a buffer memory, a flash memory, a hard drive, a mobile medium, a volatile memory, a nonvolatile memory, or other suitable devices, which may store the above network deployment information, and may further store a program executing related information. And the central processing unit 1401 may execute the program stored in the memory 1402, so as to realize information storage or processing, etc. Functions of other parts are similar to those of the related art, which shall not be described herein any further. The parts of the terminal equipment 1400 may be realized by specific hardware, firmware, software, or any combination thereof, without departing from the scope of the present disclosure.

With the terminal equipment of this embodiment, in determining a position of a routing node, optimizing the number of routing nodes and optimizing routing paths are both taken into account, thereby obtaining a routing node deployment scheme with minimum routing nodes and which can also ensure data transmission performance of the network.

Embodiment 3

The embodiment of this disclosure provides a method for determining a position of a routing node. As principles of the method for solving problems are similar to that of the apparatus in Embodiment 1, the implementation of the apparatus in Embodiment 1 may be referred to for implementation of the method, with identical contents being not going to be described herein any further.

Figure 15:
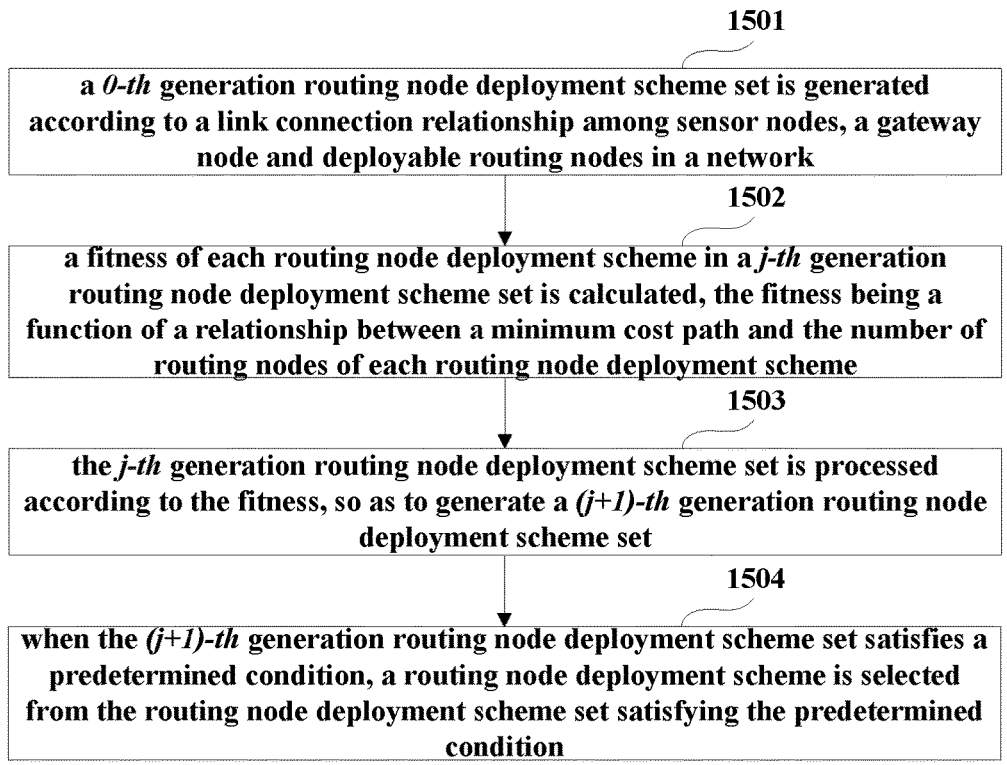
FIG. 15 is a schematic diagram of a method for determining a position of a routing node in Embodiment 3.

FIG. 15 is a flowchart of an implementation of the method for determining a position of a routing node of this embodiment. Referring to FIG. 15, the method includes:

step 1501: a 0-th generation routing node deployment scheme set is generated according to a link connection relationship among sensor nodes, a gateway node and deployable routing nodes in a network;

step 1502: a fitness of each routing node deployment scheme in a j-th generation routing node deployment scheme set is calculated, the fitness being a function of a relationship between a minimum cost path and the number of routing nodes of each routing node deployment scheme, and j being an integer greater than or equal to 0;

step 1503: the j-th generation routing node deployment scheme set is processed according to the fitness, so as to generate a (j+1)-th generation routing node deployment scheme set; and step 1504: when the (j+1)-th generation routing node deployment scheme set satisfies a predetermined condition, a routing node deployment scheme is selected from the routing node deployment scheme set satisfying the predetermined condition.

In this embodiment, in step 1502, the fitness of each routing node deployment scheme may be calculated according to the number of routing nodes of each routing node deployment scheme and a routing cost difference between a first minimum cost path from each sensor node to the gateway node and a second minimum cost path from each sensor node to the gateway node.

In this embodiment, the first minimum cost path passes routing nodes in a range of routing node positions in the routing node deployment scheme, and the second minimum cost path passes routing nodes in a range of all the deployable routing nodes.

In an implementation, the fitness F of each routing node deployment scheme may be calculated by using formula (1) in the embodiment 1, and Embodiment 1 may be referred to for a particular calculation method, which shall not be described herein any further.

In this embodiment, the predetermined condition is that j+1 equals to a first threshold value N, N being an integer greater than or equal to 1; and when the (j+1)-th generation routing node deployment scheme set satisfies the predetermined condition, it turns back to step 1502 to calculate the fitness of each routing node deployment scheme in the (j+1)-th generation routing node deployment scheme set; and in step 1504, the routing node deployment scheme of a minimum fitness is determined as a final routing node deployment scheme.

In this embodiment, when the (j+1)-th generation routing node deployment scheme set does not satisfy the predetermined condition, it turns back to step 1502 to calculate the fitness of each routing node deployment scheme in the (j+1)-th generation routing node deployment scheme set; and in step 1503, the (j+1)-th generation routing node deployment scheme set is processed according to the fitness of each routing node deployment scheme in the (j+1)-th generation routing node deployment scheme set to generate a (j+2)-th generation routing node deployment scheme set.

Figure 16:
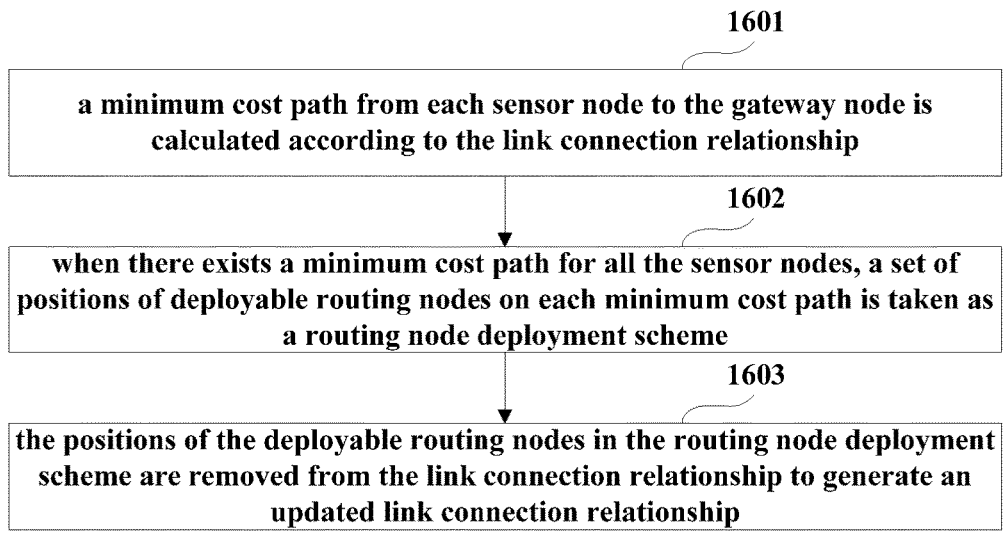
FIG. 16 is a flowchart of an implementation of step 1501 in Embodiment 3.

FIG. 16 is a flowchart of a method of an implementation of step 1501 in this embodiment. As shown in FIG. 16, the method includes:

step 1601: a minimum cost path from each sensor node to the gateway node is calculated according to the link connection relationship;

step 1602: when there exists a minimum cost path for all the sensor nodes, a set of positions of deployable routing nodes on each minimum cost path is taken as a routing node deployment scheme; and step 1603: the positions of the deployable routing nodes in the routing node deployment scheme are removed from the link connection relationship to generate an updated link connection relationship, so as to generate a next routing node deployment scheme according to the updated link connection relationship.

In this embodiment, in step 1602, when there exists a sensor node with no minimum cost path in all the sensor nodes, a previously-obtained routing node deployment scheme set is taken as the 0-th generation routing node deployment scheme set.

Figure 17:
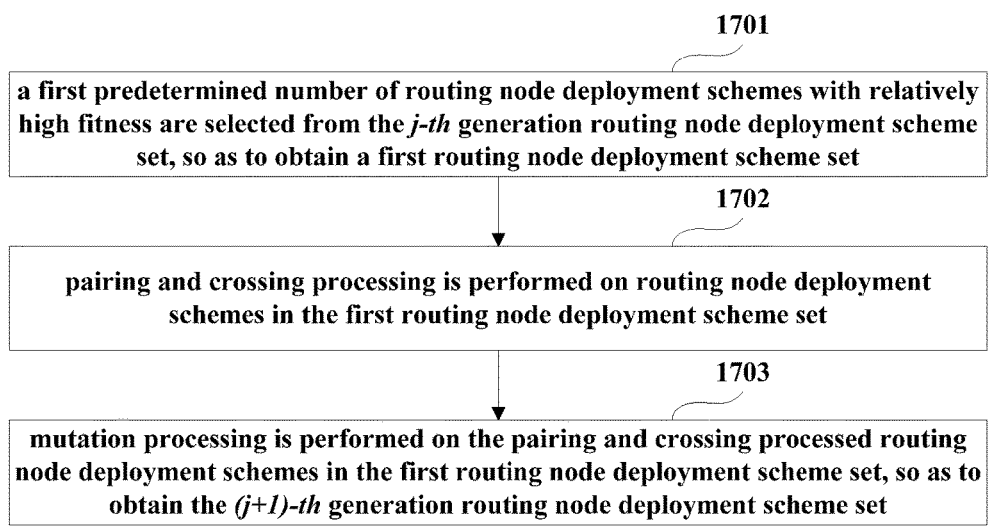
FIG. 17 is a flowchart of an implementation of step 1503 in Embodiment 3.

FIG. 17 is a flowchart of a method of an implementation of step 1503 in this embodiment. As shown in FIG. 17, the method includes:

step 1701: a first predetermined number of routing node deployment schemes with relatively high fitness are selected from the j-th generation routing node deployment scheme set, so as to obtain a first routing node deployment scheme set;

step 1702: pairing and crossing processing is performed on routing node deployment schemes in the first routing node deployment scheme set; and step 1703: mutation processing is performed on the pairing and crossing processed routing node deployment schemes in the first routing node deployment scheme set, so as to obtain the (j+1)-th generation routing node deployment scheme set.

In an implementation, in step 1703, deployment positions of a second predetermined number of first deployable routing nodes in the routing node deployment scheme may be replaced with a position of a neighboring node of the deployment positions of the first deployable routing nodes.

In another implementation, in step 1703, deployment positions of a third predetermined number of pairs of second deployable routing nodes may be selected from the routing node deployment scheme, a minimum cost path between deployment positions of each pair of second deployable routing nodes may be calculated, and deployment positions of third deployable routing nodes on the minimum cost path may be added into the routing node deployment scheme.

With the method of this embodiment, in determining a position of a routing node, optimizing the number of routing nodes and optimizing routing paths are both taken into account, thereby obtaining a routing node deployment scheme with minimum routing nodes and which can also ensure data transmission performance of the network.

An embodiment of the present disclosure provides a computer readable program code, which, when executed in terminal equipment, will cause a computer unit to carry out the method described in Embodiment 3 in the terminal equipment.

An embodiment of the present disclosure provides a non-transitory computer readable medium, including a computer readable program code, which will cause a computer unit to carry out the method described in Embodiment 3 in terminal equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For implementations of the present disclosure containing the above embodiments, following supplements are further disclosed.

Supplement 1. An apparatus for determining a position of a routing node, including:

an initializing module configured to generate a 0-th generation routing node deployment scheme set according to a link connection relationship among sensor nodes, a gateway node and deployable routing nodes in a network;

an evaluating module configured to calculate a fitness of each routing node deployment scheme in a j-th generation routing node deployment scheme set, the fitness being a function of a relationship between a minimum cost path and the number of routing nodes of each routing node deployment scheme, and j being an integer greater than or equal to 0;

a processing module configured to process the j-th generation routing node deployment scheme set according to the fitness, so as to generate a (j+1)-th generation routing node deployment scheme set; and a first determining module configured to, when the (j+1)-th generation routing node deployment scheme set satisfies a predetermined condition, select a routing node deployment scheme from the routing node deployment scheme set satisfying the predetermined condition.

Supplement 2. The apparatus according to supplement 1, wherein the evaluating module calculates the fitness of each routing node deployment scheme according to the number of routing nodes of each routing node deployment scheme and a routing cost difference between a first minimum cost path from each sensor node to the gateway node and a second minimum cost path from each sensor node to the gateway node;

wherein, the first minimum cost path passes routing nodes in a range of routing node positions in the routing node deployment scheme, and the second minimum cost path passes routing nodes in a range of all the deployable routing nodes.

Supplement 3. The apparatus according to supplement 2, wherein the evaluating module calculates the fitness F of each routing node deployment scheme by using the following formula:

$$F = |I| + \lambda \frac{\sum_{p_i \in P_S} l_i - l'_i}{|P_S|};$$

where, $|I|$ is the number of the routing nodes of the routing node deployment scheme, $|P_S|$ is the number of the sensor nodes in the network, $l_i$ is a routing cost of the first minimum cost path, $l'_i$ is a routing cost of the second minimum cost path, λ is used to adjust a relationship between a routing path length and the number of the routing nodes, and i is an integer between 1 and S.

Supplement 4. The apparatus according to supplement 1, wherein the predetermined condition is that j+1 equals to a first threshold value N, N being an integer greater than or equal to 1; and when the (j+1)-th generation routing node deployment scheme set satisfies the predetermined condition, the evaluating module calculates the fitness of each routing node deployment scheme in the (j+1)-th generation routing node deployment scheme set;

the first determining module determines a routing node deployment scheme of a minimum fitness as a final routing node deployment scheme;

and when the (j+1)-th generation routing node deployment scheme set does not satisfy the predetermined condition, the evaluating module calculates the fitness of each routing node deployment scheme in the (j+1)-th generation routing node deployment scheme set, and the processing module processes the (j+1)-th generation routing node deployment scheme set according to the fitness of each routing node deployment scheme in the (j+1)-th generation routing node deployment scheme set, so as to generate a (j+2)-th generation routing node deployment scheme set.

Supplement 5. The apparatus according to supplement 1, wherein the initializing module includes:

a calculating module configured to calculate a minimum cost path from each sensor node to the gateway node according to the link connection relationship;

a second determining module configured to, when there exists a minimum cost path for all the sensor nodes, take a set of positions of deployable routing nodes on each minimum cost path as a routing node deployment scheme; and an updating module configured to remove the positions of the deployable routing nodes in the routing node deployment scheme from the link connection relationship to generate an updated link connection relationship, so that the initializing module generates a next routing node deployment scheme according to the updated link connection relationship.

Supplement 6. The apparatus according to supplement 5, wherein when there exists a sensor node with no minimum cost path in all the sensor nodes, the second determining module takes a previously-obtained routing node deployment scheme set as the 0-th generation routing node deployment scheme set.

Supplement 7. The apparatus according to supplement 1, wherein the processing module includes:

a selecting module configured to select a first predetermined number of routing node deployment schemes with relatively high fitness from the j-th generation routing node deployment scheme set, so as to obtain a first routing node deployment scheme set;

a pairing and crossing module configured to perform pairing and crossing processing on routing node deployment schemes in the first routing node deployment scheme set; and a mutation module configured to perform mutation processing on the pairing and crossing processed routing node deployment schemes in the first routing node deployment scheme set, so as to obtain the (j+1)-th generation routing node deployment scheme set.

Supplement 8. The apparatus according to supplement 7, wherein the mutation module includes:

a first mutation module configured to replace deployment positions of a second predetermined number of first deployable routing nodes in the routing node deployment scheme with a position of a routing neighboring node of the deployment positions of the first deployable routing nodes;

or, a second mutation module configured to select deployment positions of a third predetermined number of pairs of second deployable routing nodes from the routing node deployment scheme, calculate a minimum cost path between deployment positions of each pair of second deployable routing nodes, and add deployment positions of third deployable routing nodes on the minimum cost path into the routing node deployment scheme.

Supplement 9. Terminal equipment, including the apparatus as described in supplement 1.

Supplement 10. A method for determining a position of a routing node, including:

generating a 0-th generation routing node deployment scheme set according to a link connection relationship among sensor nodes, a gateway node and deployable routing nodes in a network;

calculating a fitness of each routing node deployment scheme in a j-th generation routing node deployment scheme set, the fitness being a function of a relationship between a minimum cost path and the number of routing nodes of each routing node deployment scheme, and j being an integer greater than or equal to 0;

processing the j-th generation routing node deployment scheme set according to the fitness, so as to generate a (j+1)-th generation routing node deployment scheme set; and when the (j+1)-th generation routing node deployment scheme set satisfies a predetermined condition, selecting a routing node deployment scheme from the routing node deployment scheme set satisfying the predetermined condition.

Supplement 11. The method according to supplement 10, wherein the fitness of each routing node deployment scheme is calculated according to the number of routing nodes of each routing node deployment scheme and a routing cost difference between a first minimum cost path from each sensor node to the gateway node and a second minimum cost path from each sensor node to the gateway node;

wherein, the first minimum cost path passes routing nodes in a range of routing node positions in the routing node deployment scheme, and the second minimum cost path passes routing nodes in a range of all the deployable routing nodes.

Supplement 12. The method according to supplement 11, wherein the fitness F of each routing node deployment scheme is calculated by using the following formula:

$$F = |I| + \lambda \frac{\sum_{p_i \in P_S} l_i - l_i'}{|P_S|};$$

where, |I| is the number of the routing nodes of the routing node deployment scheme, $|P_S|$ is the number of the sensor nodes in the network, $l_i$ is a routing cost of the first minimum cost path, $l_i'$ is a routing cost of the second minimum cost path, λ is used to adjust a relationship between a routing path length and the number of the routing nodes, and i is an integer between 1 and S.

Supplement 13. The method according to supplement 10, wherein the predetermined condition is that j+1 equals to a first threshold value N, N being an integer greater than or equal to 1; and when the (j+1)-th generation routing node deployment scheme set satisfies the predetermined condition, the fitness of each routing node deployment scheme in the (j+1)-th generation routing node deployment scheme set is calculated, and a routing node deployment scheme of a minimum fitness is determined as a final routing node deployment scheme.

Supplement 14. The method according to supplement 10, wherein the generating a 0-th generation routing node deployment scheme set according to a link connection relationship among sensor nodes, a gateway node and deployable routing nodes in a network, includes:

calculating a minimum cost path from each sensor node to the gateway node according to the link connection relationship;

when there exists a minimum cost path for all the sensor nodes, taking a set of positions of deployable routing nodes on each minimum cost path as a routing node deployment scheme;

removing the positions of the deployable routing nodes in the routing node deployment scheme from the link connection relationship to generate an updated link connection relationship, so as to generate a next routing node deployment scheme according to the updated link connection relationship; and when the (j+1)-th generation routing node deployment scheme set does not satisfy the predetermined condition, the fitness of each routing node deployment scheme in the (j+1)-th generation routing node deployment scheme set is calculated, and the (j+1)-th generation routing node deployment scheme set is processed according to the fitness of each routing node deployment scheme in the (j+1)-th generation routing node deployment scheme set, so as to generate a (j+2)-th generation routing node deployment scheme set.

Supplement 15. The method according to supplement 14, wherein when there exists a sensor node with no minimum cost path in all the sensor nodes, a previously-obtained routing node deployment scheme set is taken as the 0-th generation routing node deployment scheme set.

Supplement 16. The method according to supplement 10, wherein the processing the j-th generation routing node deployment scheme set according to the fitness, so as to generate a (j+1)-th generation routing node deployment scheme set, includes:

selecting a first predetermined number of routing node deployment schemes with relatively high fitness from the j-th generation routing node deployment scheme set, so as to obtain a first routing node deployment scheme set;

performing pairing and crossing processing on routing node deployment schemes in the first routing node deployment scheme set; and performing mutation processing on the pairing and crossing processed routing node deployment schemes in the first routing node deployment scheme set, so as to obtain the (j+1)-th generation routing node deployment scheme set.

Supplement 17. The method according to supplement 16, wherein the performing mutation processing on the pairing and crossing processed routing node deployment schemes in the first routing node deployment scheme set includes:

replacing deployment positions of a second predetermined number of first deployable routing nodes in the routing node deployment scheme with a position of a routing neighboring node of the deployment positions of the first deployable routing nodes;

or, selecting deployment positions of a third predetermined number of pairs of second deployable routing nodes from the routing node deployment scheme, calculating a minimum cost path between deployment positions of each pair of second deployable routing nodes, and adding deployment positions of third deployable routing nodes on the minimum cost path into the routing node deployment scheme.

Although a few embodiments have been shown and described, it would be appreciated by those skilled in the art that changes may be made in these embodiments without departing from the principles thereof, the scope of which is defined in the claims and their equivalents.

What is claimed is:

1. An apparatus for determining a position of a routing node, including:

a processor, including:

an initializing module configured to generate a 0-th generation routing node deployment scheme set according to a link connection relationship among sensor nodes, a gateway node and deployable routing nodes in a network;

an evaluating module configured to calculate a fitness of each routing node deployment scheme in a j-th generation routing node deployment scheme set, the fitness being a function of a relationship between a minimum cost path, based on a routing cost difference between a first minimum cost path from each sensor node to the gateway node via first routing nodes in a range of routing node positions in the routing node deployment scheme, and a second minimum cost path from each sensor node to the gateway node via second routing nodes in a range of all the deployable routing nodes, and a number of routing nodes of each routing node deployment scheme, j being an integer greater than or equal to 0;

a processing module configured to process the j-th generation routing node deployment scheme set according to the fitness to generate a (j+1)-th generation routing node deployment scheme set; and a first determining module configured to, when the (j+1)-th generation routing node deployment scheme set satisfies a predetermined condition, select a routing node deployment scheme satisfying the predetermined condition.

2. The apparatus according to claim 1, wherein the evaluating module calculates the fitness F of each routing node deployment scheme by using the following formula:

$$F = |I| + \lambda \frac{\sum_{p_i \in P_S} l_i - l'_i}{|P_S|};$$

where, $|I|$ is the number of the routing nodes of the routing node deployment scheme, $|P_S|$ is the number of the sensor nodes in the network, $l_i$ is a routing cost of the first minimum cost path, $l_i'$ is a routing cost of the second minimum cost path, $\lambda$ is used to adjust a relationship between a routing path length and the number of the routing nodes, and i is an integer between 1 and S.

3. The apparatus according to claim 1, wherein the predetermined condition is that j+1 equals a first threshold value N, N being an integer greater than or equal to 1; and when the (j+1)-th generation routing node deployment scheme set satisfies the predetermined condition, the evaluating module calculates the fitness of each routing node deployment scheme in the (j+1)-th generation routing node deployment scheme set;

the first determining module determines the routing node deployment scheme of a minimum fitness as a final routing node deployment scheme;

and when the (j+1)-th generation routing node deployment scheme set does not satisfy the predetermined condition, the evaluating module calculates the fitness of each routing node deployment scheme in the (j+1)-th generation routing node deployment scheme set, and the processing module processes the (j+1)-th generation routing node deployment scheme set according to the fitness of each routing node deployment scheme in the (j+1)-th generation routing node deployment scheme set to generate a (j+2)-th generation routing node deployment scheme set.

4. The apparatus according to claim 1, wherein the initializing module includes:

a calculating module configured to calculate a minimum cost path from each sensor node to the gateway node according to the link connection relationship;

a second determining module configured to, when there exists a minimum cost path for all the sensor nodes, take a set of positions of deployable routing nodes on each minimum cost path as a routing node deployment scheme; and an updating module configured to remove the positions of the deployable routing nodes in the routing node deployment scheme from the link connection relationship to generate an updated link connection relationship where the initializing module generates a next routing node deployment scheme according to the updated link connection relationship.

5. The apparatus according to claim 4, wherein when there exists a sensor node with no minimum cost path in all the sensor nodes, the second determining module takes a previously-obtained routing node deployment scheme set as the 0-th generation routing node deployment scheme set.

6. The apparatus according to claim 1, wherein the processing module includes:

a selecting module configured to select a first predetermined number of routing node deployment schemes with a relatively high fitness from the j-th generation routing node deployment scheme set to obtain a first routing node deployment scheme set;

a pairing and crossing module configured to perform pairing and crossing processing on routing node deployment schemes in the first routing node deployment scheme set; and a mutation module configured to perform mutation processing on pairing and crossing processed routing node deployment schemes in the first routing node deployment scheme set to obtain the (j+1)-th generation routing node deployment scheme set.

7. The apparatus according to claim 6, wherein the mutation module includes one of:

a first mutation module configured to replace deployment positions of a second predetermined number of first deployable routing nodes in the routing node deployment scheme with a position of a routing neighboring node of the deployment positions of the first deployable routing nodes; and, a second mutation module configured to select deployment positions of a third predetermined number of pairs of second deployable routing nodes from the routing node deployment scheme, calculate a minimum cost path between deployment positions of each pair of second deployable routing nodes, and add deployment positions of third deployable routing nodes on the minimum cost path into the routing node deployment scheme.

8. Terminal equipment, including the apparatus as described in claim 1.

9. A method for determining a position of a routing node, including:

generating a 0-th generation routing node deployment scheme set according to a link connection relationship among sensor nodes, a gateway node and deployable routing nodes in a network;

calculating a fitness of each routing node deployment scheme in a j-th generation routing node deployment scheme set, the fitness being a function of a relationship between a minimum cost path, based on a routing cost difference between a first minimum cost path from each sensor node to the gateway node via first routing nodes in a range of routing node positions in the routing node deployment scheme, and a second minimum cost path from each sensor node to the gateway node via second routing nodes in a range of all the deployable routing nodes, and a number of routing nodes of each routing node deployment scheme, j being an integer greater than or equal to 0;

processing the j-th generation routing node deployment scheme set according to the fitness to generate a (j+1)-th generation routing node deployment scheme set; and when the (j+1)-th generation routing node deployment scheme set satisfies a predetermined condition, selecting a routing node deployment scheme satisfying the predetermined condition.

10. The method according to claim 9, wherein the fitness F of each routing node deployment scheme is calculated by using the following formula:

$$F = |I| + \lambda \frac{\sum_{p_i \in P_S} l_i - l_i'}{|P_S|};$$

where, $|I|$ is the number of the routing nodes of the routing node deployment scheme, $|P_S|$ is the number of the sensor nodes in the network, $l_i$ is a routing cost of the first minimum cost path, $l_i'$ is a routing cost of the second minimum cost path, $\lambda$ is used to adjust a relationship between a routing path length and the number of the routing nodes, and i is an integer between 1 and S.

11. The method according to claim 9, wherein the predetermined condition is that j+1 equals a first threshold value N, N being an integer greater than or equal to 1; and when the (j+1)-th generation routing node deployment scheme set satisfies the predetermined condition, the fitness of each routing node deployment scheme in the (j+1)-th generation routing node deployment scheme set is calculated, and a routing node deployment scheme of a minimum fitness is determined as a final routing node deployment scheme.

12. The method according to claim 9, wherein the generating a 0-th generation routing node deployment scheme set according to a link connection relationship among sensor nodes, a gateway node and deployable routing nodes in a network, includes:

calculating a minimum cost path from each sensor node to the gateway node according to the link connection relationship;

when there exists a minimum cost path for all the sensor nodes, taking a set of positions of deployable routing nodes on each minimum cost path as a routing node deployment scheme;

removing the positions of the deployable routing nodes in the routing node deployment scheme from the link connection relationship to generate an updated link connection relationship to generate a next routing node deployment scheme according to the updated link connection relationship; and when the (j+1)-th generation routing node deployment scheme set does not satisfy the predetermined condition, the fitness of each routing node deployment scheme in the (j+1)-th generation routing node deployment scheme set is calculated, and the (j+1)-th generation routing node deployment scheme set is processed according to the fitness of each routing node deployment scheme in the (j+1)-th generation routing node deployment scheme set to generate a (j+2)-th generation routing node deployment scheme set.

13. The method according to claim 12, wherein when there exists a sensor node with no minimum cost path in all the sensor nodes, a previously-obtained routing node deployment scheme set is taken as the 0-th generation routing node deployment scheme set.

14. The method according to claim 9, wherein the processing the j-th generation routing node deployment scheme set according to the fitness, so as to generate a (j+1)-th generation routing node deployment scheme set, includes:

selecting a first predetermined number of routing node deployment schemes with a relatively high fitness from the j-th generation routing node deployment scheme set to obtain a first routing node deployment scheme set;

performing pairing and crossing processing on routing node deployment schemes in the first routing node deployment scheme set; and performing mutation processing on pairing and crossing processed routing node deployment schemes in the first routing node deployment scheme set to obtain the (j+1)-th generation routing node deployment scheme set.

15. The method according to claim 14, wherein the performing mutation processing on the pairing and crossing processed routing node deployment schemes in the first routing node deployment scheme set includes one of:

replacing deployment positions of a second predetermined number of first deployable routing nodes in the routing node deployment scheme with a position of a routing neighboring node of the deployment positions of the first deployable routing nodes; and, selecting deployment positions of a third predetermined number of pairs of second deployable routing nodes from the routing node deployment scheme, calculating a minimum cost path between deployment positions of each pair of second deployable routing nodes, and adding deployment positions of third deployable routing nodes on the minimum cost path into the routing node deployment scheme.

* * * * *